(12) United States Patent
Parnell et al.

(10) Patent No.: US 11,315,035 B2
(45) Date of Patent: Apr. 26, 2022

(54) MACHINE LEARNING IN HETEROGENEOUS PROCESSING SYSTEMS

(71) Applicant: International Business Machines Corporation, Armonk, NY (US)

(72) Inventors: Thomas Parnell, Zürich (CH); Celestine Duenner, Wettswil (CH); Charalampos Pozidis, Thalwil (CH); Dimitrios Sarigiannis, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 16/214,918

(22) Filed: Dec. 10, 2018

(65) Prior Publication Data

US 2020/0184369 A1 Jun. 11, 2020

(51) Int. Cl.
*G06N 20/00* (2019.01)
*G06K 9/62* (2022.01)
*G06F 17/11* (2006.01)
*G06N 7/08* (2006.01)
*G06F 7/58* (2006.01)

(52) U.S. Cl.
CPC ............ *G06N 20/00* (2019.01); *G06F 7/588* (2013.01); *G06F 17/11* (2013.01); *G06K 9/6256* (2013.01); *G06N 7/08* (2013.01)

(58) Field of Classification Search
None
See application file for complete search history.

(56) References Cited

U.S. PATENT DOCUMENTS 9,721,361 B2 8/2017 Pal et al.
2017/0371665 A1 12/2017 Breternitz et al.

OTHER PUBLICATIONS

Li M, Andersen DG, Park JW, Smola AJ, Ahmed A, Josifovski V, Long J, Shekita EJ, Su BY. Scaling distributed machine learning with the parameter server. In 11th USENIX Symposium on Operating Systems Design and Implementation (OSDI 14) 2014 (pp. 583-598). (Year: 2014).*

(Continued)

*Primary Examiner* — Vincent Gonzales
(74) *Attorney, Agent, or Firm* — Cantor Colburn LLP; Daniel Morris

(57) ABSTRACT

Computer-implemented methods are provided for implementing training of a machine learning model in a heterogeneous processing system comprising a host computer operatively interconnected with an accelerator unit. The training includes a stochastic optimization process for optimizing a function of a training data matrix X, having data elements $X_{i,j}$ with row coordinates i=1 to n and column coordinates j=1 to m, and a model vector w having elements $w_j$. For successive batches of the training data, defined by respective subsets of one of the row coordinates and column coordinates, random numbers associated with respective coordinates in a current batch b are generated in the host computer and sent to the accelerator unit. In parallel with generating the random numbers for batch b, batch b is copied from the host computer to the accelerator unit.

25 Claims, 4 Drawing Sheets

(56) References Cited

OTHER PUBLICATIONS

Parnell T, Dünner C, Atasu K, Sifalakis M, Pozidis H. Large-scale stochastic learning using GPUs. In2017 IEEE International Parallel and Distributed Processing Symposium Workshops (IPDPSW) May 29, 2017 (pp. 419-428). IEEE. (Year: 2017).*
Jaggi M, Smith V, Takae M, Terhorst J, Krishnan S, Hofmann T, Jordan MI. Communication-efficient distributed dual coordinate ascent. Advances in neural information processing systems. 2014; 27. (Year: 2014).*
Dünner et al., "Efficient Use of Limited-Memory Accelerators for Linear Learning on Heterogeneous Systems," 31st Conference on Neural Information Processing Systems, 2017, 18 pages.
Hsieh et al., "A Dual Coordinate Descent Method for Large-scale Linear SVM," Proceedings of the 25th International Conference on Machine Learning, ACM, 2008, 14 pages.
Hsieh et al., "PASSCoDe: Parallel ASynchronous Stochastic dual Co-ordinate Descent," Proceedings of the 32nd International Conference on Machine Learning, 2015, 17 pages.
Luitjens, "CUDA Streams Best Practices and Common Pitfalls," GPU Technology Conference, Nvidia, 2014, 71 pages.
Parnell et al., "Large-Scale Stochastic Learning using GPUs," arXiv preprint arXiv:1702.07005, 2017, 10 pages.
Shalev-Shwartz et al., "Stochastic Dual Coordinate Ascent Methods for Regularized Loss Minimization," Journal of Machine Learning Research 14, 2013, pp. 567-599.

* cited by examiner

MACHINE LEARNING IN HETEROGENEOUS PROCESSING SYSTEMS

BACKGROUND

The present invention relates generally to machine learning in heterogeneous processing systems. Methods are provided for implementing training of machine learning models in heterogeneous systems via a stochastic optimization process, together with apparatus and computer program products for performing such methods.

Machine learning is a cognitive computing technique that allows a processing system to "learn" procedures for tackling complex tasks which are not programmed in a conventional manner. Machine learning involves processing a (typically massive) dataset of training data from some real-word application in relation to a basic model for the application in order to train, or optimize, the model for the application in question. The model can then be applied to perform tasks based on new (unseen) data generated in that application. Machine learning techniques are used in numerous applications in science and technology. Some examples include computer vision, speech recognition, click-through rate prediction, medical diagnosis, genetic analysis, pharmaceutical drug design, and numerous applications in the field of computer networks such as intruder detection, email filtering, fault analysis and network maintenance.

Machine learning problems typically require optimization of some objective function of a training data matrix X and a model vector w. The matrix X of training data is an n-by-m matrix having data elements $X_{i,j}$ with row coordinates i=1 to n and column coordinates j=1 to m. The model vector w is a length-m vector having model elements $w_j$. Various optimization techniques, including stochastic optimization processes such as stochastic gradient descent and stochastic coordinate descent, can be used for the optimization process. Stochastic optimization processes involve a random-permutation step so that particular coordinates (e.g. corresponding to elements $w_j$ of the model vector, or rows/columns of the matrix X) are processed in a randomized order in computational steps of the iterative optimization process. The permutation step can be achieved by generating random numbers for respective coordinates and then sorting (ordering) the random numbers so as to randomly permute the coordinates. Stochastic coordinate descent (SCD) in particular has been shown to achieve state-of-the-art performance when applied to machine learning problems such as linear regression, logistic regression and support vector machines (see: "A dual coordinate descent method for large-scale linear SVM", Hsieh et al. Proceedings of the 25th international conference on Machine learning, ACM, 2008; and "Stochastic dual coordinate ascent methods for regularized loss minimization", Shalev-Shwartz and Zhang, Journal of Machine Learning Research, 14 Feb. (2013), pp. 567-599). This technique works by approximating the global optimization problem as a series of sub-problems which optimize the objective with respect to a single coordinate, selected randomly at each iteration, while keeping the other coordinates fixed.

Machine learning is a compute-intensive task, involving inherently complex processing of typically very large datasets. Significant processing resources, usually provided by powerful processing systems using multi-core CPUs (central processing units), often with accelerators such as GPUs (graphics processing units) and FPGAs (field-programmable gate arrays), are required for practical operation. To improve efficiency, methods for parallelizing SCD have been proposed that perform multiple coordinate updates in parallel, either on a multi-core CPU (see "PASSCoDe: Parallel ASynchronous Stochastic Dual Co-ordinate Descent", Hsieh, et al., ICML Vol. 15, No. 2015, 2015), or on a massively-parallel GPU (see "Large-scale stochastic learning using GPUs", Parnell et al., Parallel and Distributed Processing Symposium Workshops (IPDPSW), 2017 IEEE International, IEEE 2017). The latter method is known as twice-parallel asynchronous SCD (TPA-SCD). These methods work by performing many coordinate updates in parallel on different cores of the CPU or using multiple thread blocks on a GPU.

While TPA-SCD in particular has been shown to be very effective in terms of speed, a problem arises when the training dataset for which optimization is performed does not fit into the memory of the accelerator unit. One attempt to address this problem is proposed in the Parnell reference above. This approach distributes the optimization procedure across multiple GPUs. If one uses enough GPUs, then eventually the training data will fit. However, this incurs a cost penalty, especially when performing the optimization in the cloud where GPU resources are expensive. Another known approach is to perform the optimization in a batched, streaming fashion. Such an approach falls under the umbrella of "out-of-core" data processing. With this approach, a host CPU copies a current batch of training data onto a GPU, while the GPU performs the permutation step for coordinates in the previous batch by generating and sorting random numbers for those coordinates, and then executes the optimization procedure on that batch.

It is desirable to improve efficiency of machine learning implementations in heterogeneous systems, particularly in view of the compute-intensive nature of these tasks and the size of the datasets involved.

SUMMARY

According to at least one embodiment of the present invention there is provided a method for implementing training of a machine learning model in a heterogeneous processing system, comprising a host computer operatively interconnected with an accelerator unit, via a stochastic optimization process for optimizing a function of a training data matrix X, having data elements $X_{i,j}$ with row coordinates i=1 to n and column coordinates j=1 to m, and a model vector w having elements $w_j$. For successive batches of the training data, defined by respective subsets of one of the row coordinates and column coordinates, the method includes generating, in the host computer, random numbers associated with respective coordinates in a current batch b and sending the random numbers to the accelerator unit. In parallel with generating the random numbers for batch b, batch b is copied from the host computer to the accelerator unit. The method further comprises, in the accelerator unit and in parallel with the copying of batch b, sorting the random numbers for coordinates in the previous batch (b−1) to randomly permute the coordinates and performing the stochastic optimization process for the permuted coordinates in batch (b−1) to update the model vector w in dependence on coordinates in that batch.

Methods embodying the invention overlay operations performed by components of the heterogeneous system so as to enhance efficiency of the out-of-core training operation. Instead of sitting idle while the accelerator unit processes a batch of data, the host computer is used to generate the random numbers for the next batch. This occurs while that batch is being copied over the interconnect to the accelerator unit. The random numbers can be generated efficiently on the host computer and then sent to the accelerator ready for processing of the next batch of data. The random numbers are then sorted on the accelerator, where the sorting operation can be performed with high efficiency, to obtain the required coordinate permutation. Performing the tasks in parallel in this way provides more effective use of system resources, offering significant improvement in efficiency of machine learning operations.

In embodiments of the invention, for enhanced efficiency, the host computer generates the random numbers for respective coordinates in an asynchronous parallel fashion.

The stochastic optimization process performed by the accelerator unit may be, for example, a stochastic gradient descent process or a stochastic coordinate descent process, e.g. TPA-SCD, and can be efficiently performed in an asynchronous parallel fashion for each batch of training data.

The random numbers for a data batch b may be sent from the host computer to the accelerator unit after copying the batch b to the accelerator unit. This can be conveniently implemented in a simple, two-step pipelined procedure which iterates for successive data batches.

Respective further embodiments of the invention provide heterogeneous processing systems for implementing a method described above, and computer program products for causing a heterogeneous processing system to implement such a method.

In general, where features are described herein with reference to methods embodying the invention, corresponding features may be provided in systems/computer program products embodying the invention, and vice versa.

Embodiments of the invention will be described in more detail below, by way of illustrative and non-limiting example, with reference to the accompanying drawings.

DETAILED DESCRIPTION

Figure 1:
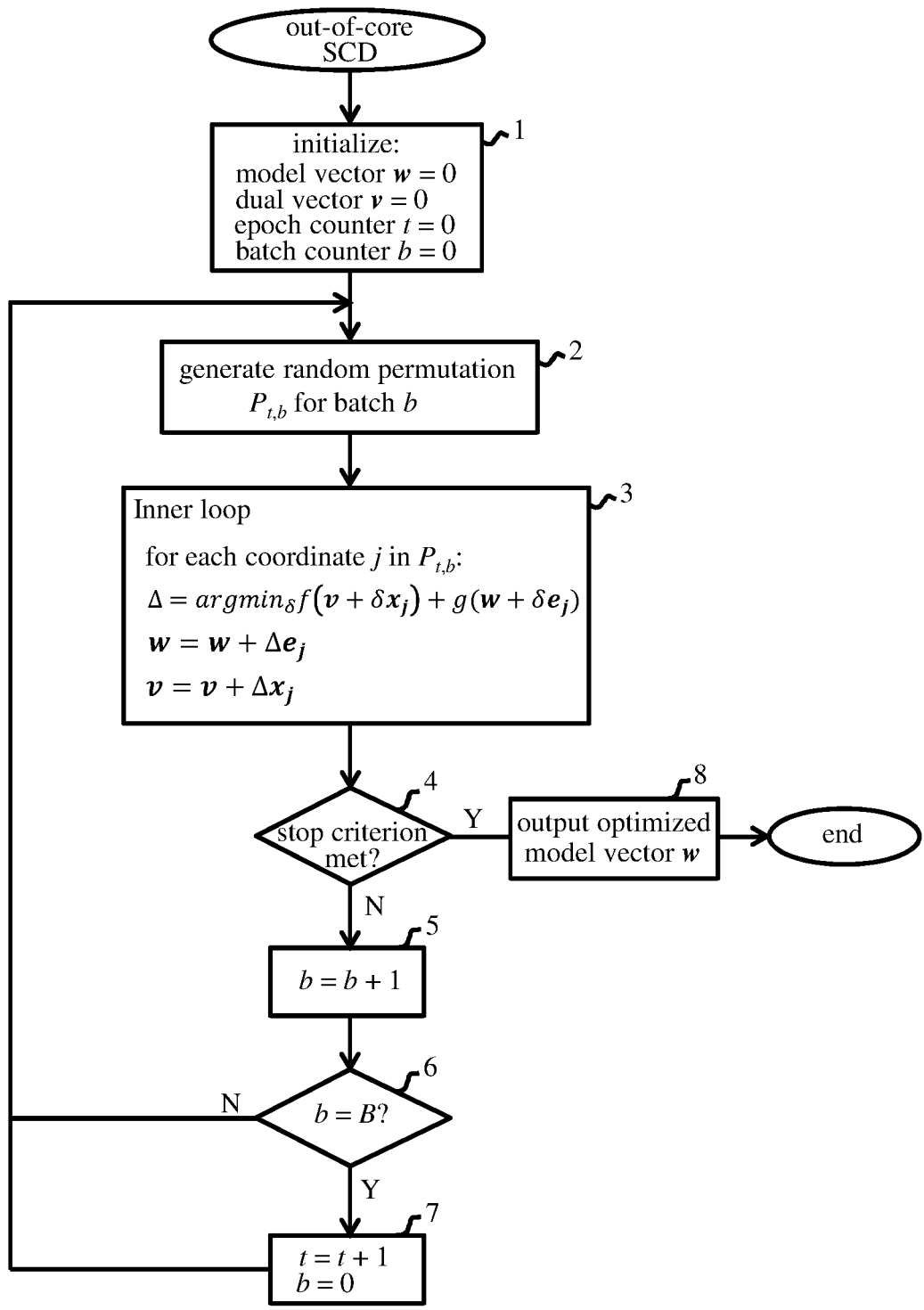
FIG. 1 indicates steps of an out-of-core SCD process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Methods embodying the invention implement training of machine learning models in heterogeneous processing systems via a stochastic optimization process. The stochastic optimization process operates to optimize some objective function of a model vector w and a training data matrix X. The matrix X of training data has n rows and m columns of data elements $X_{i,j}$, with row coordinates i=1 to n and column coordinates j=1 to m. The model vector w is an m-dimensional vector with elements $w_j$. Stochastic optimization processes such as SCD are iterative processes which repeatedly update the model vector w until some convergence criterion is met. In computational steps of this process, the model vector is updated with respect to a single coordinate, e.g. coordinate j (corresponding to elements $w_j$ of the model vector and columns of the matrix X), which is selected randomly in each iteration. This involves generating a random permutation of coordinates to determine the order in which the coordinates are processed.

In an out-of-core scenario, the optimization process is performed in a batched, streaming fashion for successive batches of training data in the matrix X. These batches are defined, in general, by respective subsets of one of the row coordinates i and column coordinates j. Hence, depending on the particular optimization process, batches are defined either by subsets of the set of rows i or by subsets of the set of columns j of matrix X. The training data is processed batch by batch, with the coordinates in each batch being randomly permuted to determine the order of processing coordinates in the batch.

FIG. 1 shows basic processing steps in an example of an out-of-core SCD process for optimizing an objective function F(w) of the general form $F(w)=f(Xw)+\Sigma_{j=1}^{m}g(w_j)$, $w \in \mathbb{R}^m$, $X \in \mathbb{R}^{n \times m}$. The function $f$ is a function of the so-called "shared vector" (or "dual vector") v which is defined as v=Xw. The function g is a function over the coordinates of the model vector w. In this example, the optimization process is performed for randomly-permuted coordinates j, and each batch of training data contains a subset of the set of columns of training data matrix X. The process comprises outer and inner iterative loops. Step 1 of FIG. 1 is an initialization step. The model vector w is initialized, here to w=0. The shared vector v is initialized accordingly, here to v=0. An outer loop ("epoch") counter t is set to t=0. A batch counter b for the number B of batches to be processed is set to b=0. In step 2, a random permutation of coordinates j in the current batch (initially the first batch b=0) is generated. The random permutation for a batch b in epoch t is denoted by $P_{t,b}$. Step 3 represents the inner iterative loop for processing coordinates in the current batch b in the order defined by the permutation $P_{t,b}$. For each coordinate j in $P_{t,b}$, an optimized shift value $\Delta$ is computed for that coordinate. The optimized shift value $\Delta$ is computed here as $\Delta = \mathrm{argmin}_\delta f(v+\delta x_j)+g(w+\delta e_j)$, where: $x_j$ is the $j^{th}$ column of the matrix X; $e_j$ is a vector of all-zeros except the $j^{th}$ coordinate which equals 1; and $\delta$ is the candidate shift with respect to the $j^{th}$ coordinate. The model vector w is then updated, in dependence on the optimized shift value $\Delta$ for coordinate j, to $w=w+\Delta e_j$. The shared vector is updated to $v=v+\Delta x_j$.

On completion of the inner loop for permuted coordinates in batch b, decision step 4 checks whether a predetermined "stop criterion", indicative of convergence, has been met. This stop criterion can be defined as desired for a given operation, e.g. obtaining a change in a specified value (such as the function F evaluated for w, or the maximum change in a component of the model vector or shared vector) that is less than a defined threshold. If the stop criterion is not met ("No" (N) at decision step 4), then the batch counter is incremented in step 5. Decision step 6 then checks whether all batches have been processed, i.e. whether b equals the total number of batches B. If not, operation reverts to step 2, and steps 2 to 4 are repeated for the next batch. When all batches have been processed, (decision "Yes" (Y) at step 6), step 7 then increments the epoch counter t and resets the batch counter to b=0. Operation then reverts to step 2 for the next iteration of the outer loop in which successive batches are reprocessed as before. When the stop criterion is met at step 4, the optimized model vector w is output at step 8, and the training operation is complete.

Figure 2:
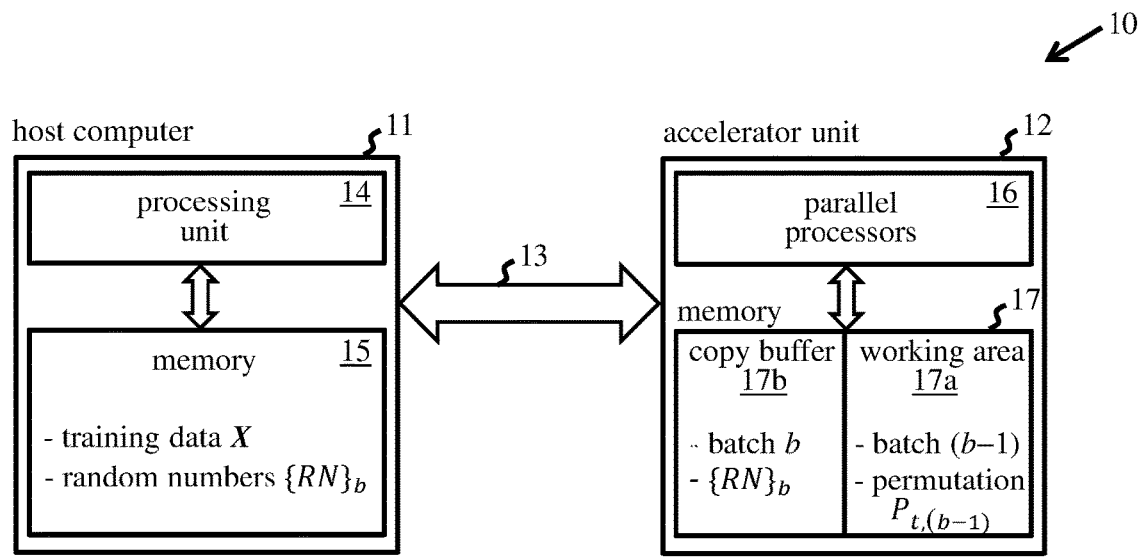
FIG. 2 is a schematic representing of a heterogeneous processing system embodying the invention.

FIG. 2 is a schematic block diagram of a heterogeneous processing system for implementing methods embodying the invention. The system 10 comprises a host computer 11 which is operatively interconnected with an accelerator unit 12 via an interconnect indicated schematically at 13. Host computer 11 has a processing unit 14 which is operatively coupled to memory 15 of the host computer. The accelerator unit 12 has a set of parallel processors 16 which are operatively coupled to memory 17 of the unit. Memory 17 is indicated schematically in the figure as partitioned into a working area 17a, containing data used in a current processing operation, and a copy buffer 17b into which data received from host computer 11 is stored for subsequent processing. In this example, host memory 15 stores the training data matrix X for a training operation. The training operation is performed for batches b of the training data successively transferred to accelerator memory 17 which has insufficient capacity for the entire matrix X. The size of the batches b is determined based on capacity of memory 17 and can be defined so as to maximize efficient use of the accelerator resources. Host memory 15 is also indicated as storing a set of random numbers, denoted by $\{RN\}_b$, for a current batch b of the training data. The working area 17a of accelerator memory 17 is indicated as storing the previous batch (b−1) of training data, along with a set of random numbers $\{RN\}_{(b-1)}$ and a permutation $P_{t,(b-1)}$ for that batch.

Figure 3:
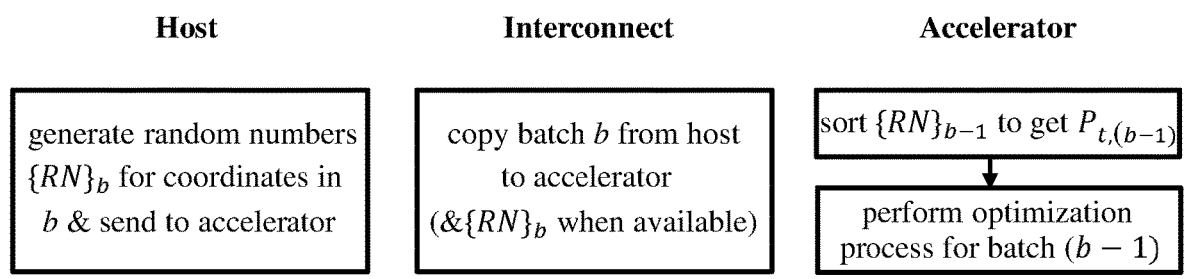
FIG. 3 indicates operational steps performed by components of the FIG. 2 system.

In operation, system 10 implements an out-of-core SCD process generally as described with reference to FIG. 1. The allocation of tasks between host computer 11 and accelerator unit 12, and the way in which tasks are overlaid in the system, is illustrated in FIG. 3. This figure indicates steps performed in parallel by the system components, host, interconnect and accelerator, for successive batches b of the training data X. As indicated on the left of the figure, the host computer 11 generates the random numbers $\{RN\}_{(b)}$ associated with respective coordinates j in a current batch b, and then sends the random numbers to accelerator unit 12. In parallel with generating the random numbers for batch b in host 11, batch b is copied from the host to the accelerator unit over interconnect 13. The random number set $\{RN\}_{(b)}$ is also copied over interconnect 13 when available, either concurrently or after copying of the data batch. In parallel with the copying of batch b over interconnect 13, accelerator unit 12 performs the steps indicated on the right of the figure. Firstly, the processors 16 of accelerator unit 12 sort the random numbers $\{RN\}_{(b-1)}$ for coordinates in the previous batch (b−1) already stored in memory 17. This sorting, i.e. ordering, of the random numbers for respective coordinates generates the permutation $P_{t,(b-1)}$. Sorting the random numbers thus randomly permutes the coordinates in batch (b−1) to determine the processing order for that batch. The processors 16 then perform the stochastic optimization process for the permuted coordinates in batch (b−1) to update the model vector w in dependence on coordinates in that batch.

Hence, accelerator unit 12 performs the sorting operation to generate the permutation $P_{t,(b-1)}$, and performs step 3 of FIG. 1 for batch (b−1), while the host generates the random numbers $\{RN\}_{(b)}$ for batch b and batch b is being copied over interconnect 13 into copy buffer 17b of the accelerator. Assigning and overlaying tasks in this way provides effective use of all system resources (host, interconnect and accelerator), offering exceptionally efficient machine learning in heterogeneous systems In general in systems embodying the invention, host computer 11 may be implemented by a general- or special-purpose computing apparatus, and processing unit 14 may comprise one or more processors, e.g. general-purpose CPUs. In embodiments of the invention, the processing unit 14 may comprise at least one multi-core CPU. This allows the "embarrassingly-parallel" nature of the random number generation process to be exploited by parallel-processing resources of the host. Accelerator unit 12 may in general comprise one or more GPUs, FPGAs or other similar devices which offer high-speed parallel processing capabilities. Such an accelerator unit may be internal or external to host computer 11. Interconnect 13 may comprise one or more communication links or buses, implementing any convenient communications protocol, depending on the particular architecture of system 10. System 10 may also include various additional elements not shown explicitly in the figure. For example, host 11 and accelerator 13 may include components such as memory controllers, processor caches, interfaces for interconnect 13, and so on.

Figure 4:
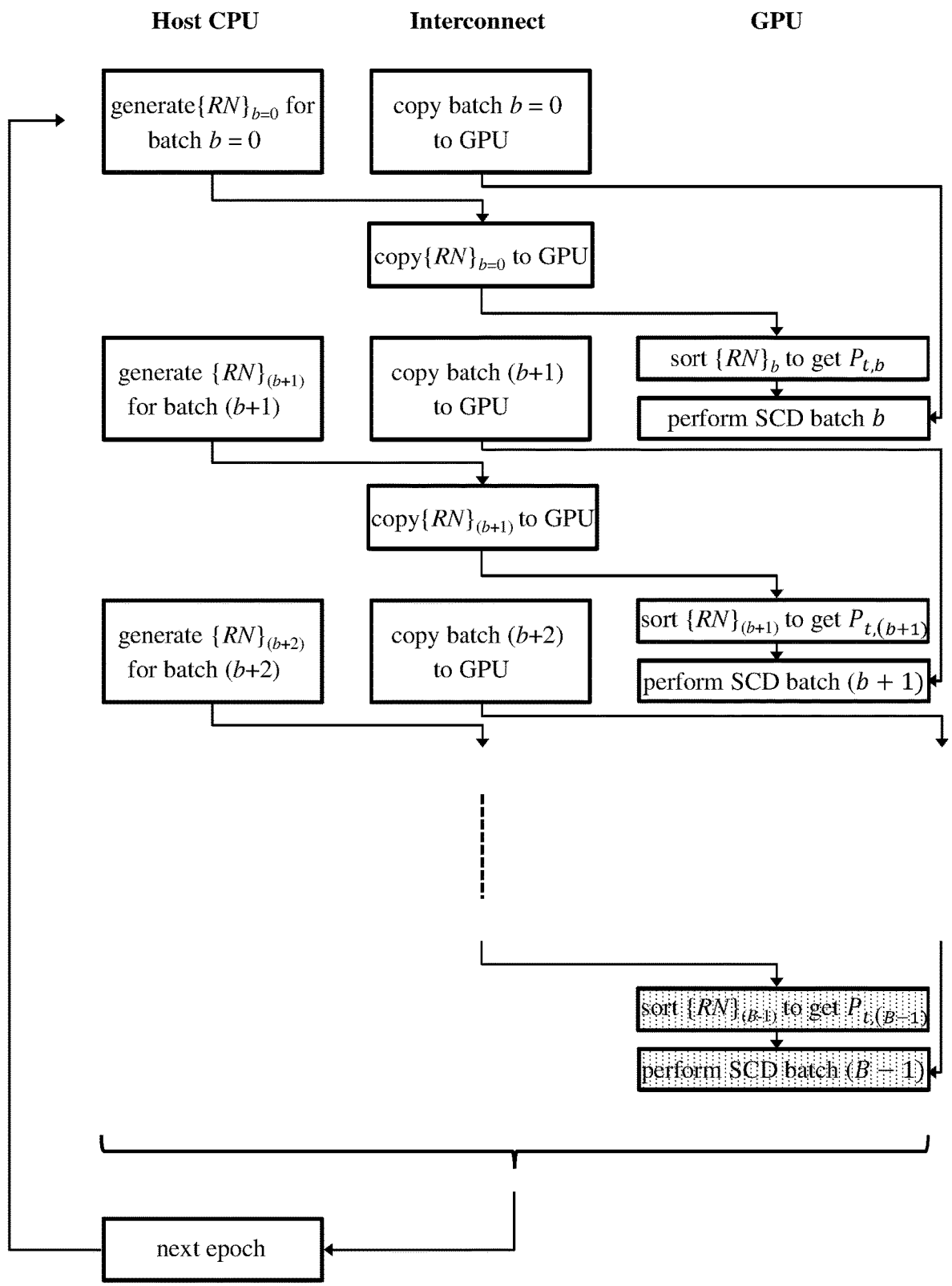
FIG. 4 illustrates iterative pipelined operation of an embodiment of the system.

The parallel operations of FIG. 3 iterate over all batches of the training data, and the operation is repeated for each epoch t of the optimization process. FIG. 4 illustrates the overall training process in an exemplary embodiment of system 10. In this embodiment, host 11 comprises a multi-core CPU and accelerator 13 comprises a GPU. The GPU comprises an array of streaming multiprocessors, e.g. CUDA (Computer Unified Device Architecture) cores, for parallel processing of multiple GPU thread blocks. Interconnect 13 is implemented via an NVLink interconnect architecture. The system leverages CUDA streams for asynchronous copying of data between the host and GPU over the multichannel NVLink interconnect. In operation of this embodiment, the random numbers $\{RN\}_{(b)}$ for batch b are sent from the host to the GPU after copying batch b to the GPU. In particular, a TPA-SCD optimization process is implemented as an iterative, two-step pipelined procedure. The pipeline steps are as follows. Copy random numbers $\{RN\}_{(b-1)}$ for batch (b−1) to GPU. The following occurs in parallel: the host CPU generates random numbers $\{RN\}_{(b)}$ for batch b coordinates; the interconnect copies batch b onto the GPU; and the GPU sorts random numbers $\{RN\}_{(b-1)}$ for batch (b−1) to generate permutation $P_{t,(b-1)}$ and performs TPA-SCD on batch (b−1).

Steps relating to the same data batch b are indicated by like shading in FIG. 3. The two-step process repeats for successive data batches, and iterates for all batches over successive epochs, until the stop criterion is met. The GPU stores the updated model vector w and shared vector v at each stage of the process, and outputs the optimized model vector to the host on convergence.

In the random number generation, the host CPU generates a 32-bit random number for every coordinate in batch b. This is implemented in an asynchronous parallel fashion using many threads across multiple cores of the CPU. The GPU sorts the random numbers for coordinates in batch (b−1) to generate a permutation of the keys to address locations of the random numbers in GPU memory. The random numbers can be efficiently sorted using known high-performance sorting algorithms, e.g. radix sort, which are commonly provided by GPU libraries such as the CUB and Thrust libraries. The ordered keys for the sorted numbers then provides the permutation $P_{t,(b-1)}$. Thread blocks are then launched on the GPU (e.g. by the host CPU or a local controller of the GPU), to perform the TPA-SCD process for the permuted coordinates. This process is performed in an asynchronous parallel fashion to make maximum use of the parallel processing resources of the GPU. In the twice parallel operation, multiple coordinates are processed in parallel, and individual computations in the optimized shift value calculation for each coordinate (Δ in FIG. 1) are performed in parallel in known manner.

An SCD process has been described above in which computations are performed for permuted coordinates j and the batches of training data are defined by respective subsets of the columns of the training data matrix X. In general, however, a stochastic optimization process may involve permutation and processing of coordinates i or j, and the data batches may be defined accordingly. For example, in the dual formulation of an SCD process, the coordinates correspond to rows of the training data matrix, and the batches for out-of-core processing are defined by respective subsets of the row coordinates i. Similarly, in a stochastic gradient descent (SGD) process, the gradient is computed (and the model vector updated) using individual training examples which are randomly permuted in each iteration. Each training example corresponds to a row of the matrix X. The "coordinates" which are permuted here thus correspond to rows i of X, though it is more usual to talk in terms of training examples rather than coordinates in an SGD context. In general, methods embodying the invention may be applied for out-of-core machine learning using any stochastic optimization process in which coordinates are randomly permuted.

Figure 5:
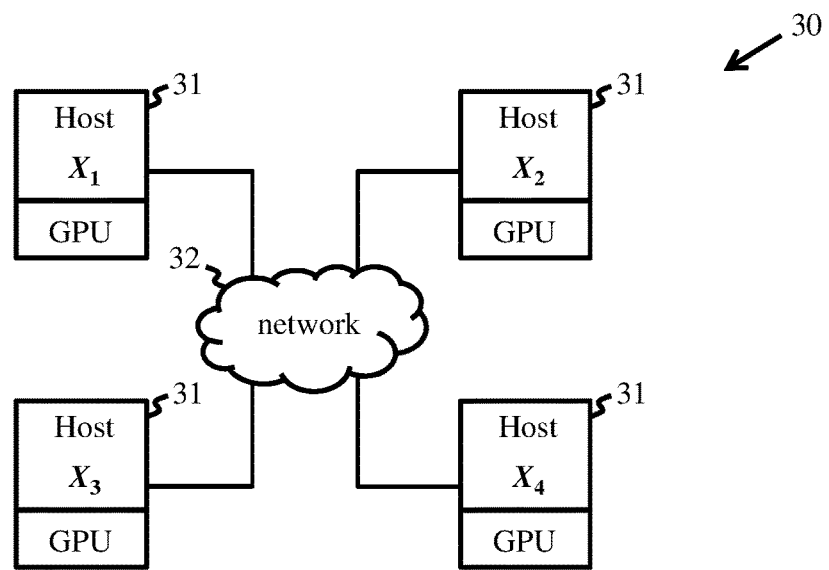
FIG. 5 illustrates structure of another heterogeneous processing system embodying the invention.

In the above embodiment, host 11 stores the training data matrix X and the successive batches b of data collectively comprise the entire matrix X. In alternative embodiments, the overall processing system may comprise multiple host-plus-accelerator systems as indicated schematically in FIG. 5. A heterogeneous system 30 is shown here comprising four sub-systems 31, each comprising a host computer with interconnected GPU, adapted for communication via a network 32. Each host computer (implemented, for example, by a server) stores a respective portion, denoted by $X_1$, $X_2$, $X_3$ and $X_4$, of the training data matrix X in memory of that host. Each portion $X_1$ to $X_4$ is defined by a respective set of either the row coordinates i or the column coordinates j of X. Each host/GPU sub-system 31 performs out-of-core processing of successive data batches defined by respective subsets of the set of coordinates in the corresponding portion $X_1$ to $X_4$ of X. The operation is generally as described above, except that each sub-system works on a portion of the coordinates of the model vector corresponding to the portion of X that it stores, and the updates to the shared vector, as calculated by each sub-system 31, are exchanged over network 32 after each epoch t of the process. These updates are aggregated to obtain the new shared vector for the next epoch. Convergence can be checked for after each epoch t, e.g. by a system controller or one of the sub-systems 31 which is designated as a master in the system.

Steps of the training process in systems embodying the invention can be implemented by program instructions, e.g. program modules, executed by a processing apparatus of the system. Generally, program instructions may include routines, programs, objects, components, logic, data structures, and so on that perform particular tasks or implement particular abstract data types. The processing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 6:
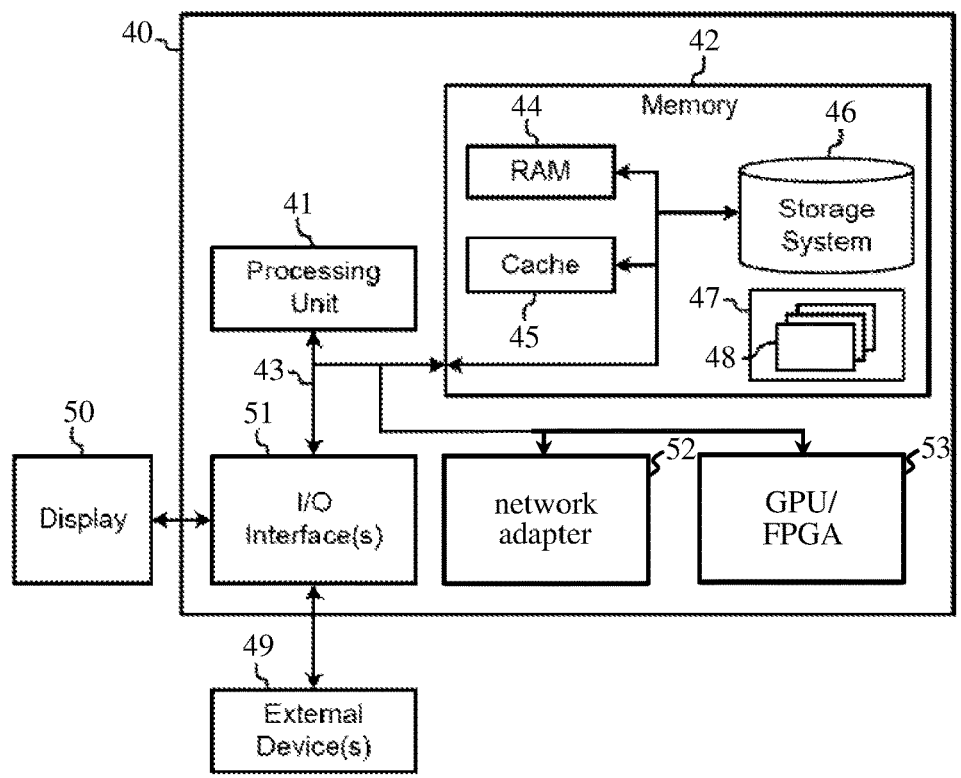
FIG. 6 is a generalized schematic of a computer system for implementing embodiments of the invention.

The block diagram of FIG. 6 shows an exemplary computing apparatus for implementing a processing system embodying the invention. The apparatus is shown here in the form of a general-purpose computing device 40. The components of computer 40 may include processing apparatus such as one or more processors represented by processing unit 41, a system memory 42, and a bus 43 that couples various system components including system memory 42 to processing unit 41.

Bus 43 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 40 typically includes a variety of computer readable media. Such media may be any available media that is accessible by computer 40 including volatile and non-volatile media, and removable and non-removable media. For example, system memory 42 can include computer readable media in the form of volatile memory, such as random access memory (RAM) 44 and/or cache memory 45. Computer 40 may further include other removable/non-removable, volatile/non-volatile computer system storage media. By way of example only, storage system 46 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 43 by one or more data media interfaces.

Memory 42 may include at least one program product having one or more program modules that are configured to carry out functions of embodiments of the invention. By way of example, program/utility 47, having a set (at least one) of program modules 48, may be stored in memory 42, as well as an operating system, one or more application programs, other program modules, and program data. Each of the operating system, one or more application programs, other program modules, and program data, or some combination thereof, may include an implementation of a networking environment. Program modules 48 generally carry out the functions and/or methodologies of embodiments of the invention as described herein.

Computer 40 may also communicate with: one or more external devices 49 such as a keyboard, a pointing device, a display 50, etc.; one or more devices that enable a user to interact with computer 40; and/or any devices (e.g., network card, modem, etc.) that enable computer 40 to communicate with one or more other computing devices. Such communication can occur via Input/Output (I/O) interfaces 51. Also, computer 40 can communicate with one or more networks such as a local area network (LAN), a general wide area network (WAN), and/or a public network (e.g., the Internet) via network adapter 52. As depicted, network adapter 52 communicates with the other components of computer 40 via bus 43. Computer 40 can also communicate with additional processing apparatus 53, such as a GPU or FPGA, implementing an accelerator unit in embodiments of the invention. It should be understood that although not shown, other hardware and/or software components could be used in conjunction with computer 50. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a machine learning model in a heterogeneous processing system comprising a host computer operatively interconnected with an accelerator unit, via a stochastic optimization process for optimizing a function of a training data matrix X, having data elements $X_{i,j}$ with row coordinates i=1 to n and column coordinates j=1 to m, and a model vector w having elements $w_j$, the computer-implemented method comprising, for successive batches of the training data defined by respective subsets of one of said row coordinates and column coordinates:

in the host computer, generating random numbers associated with respective coordinates in a current batch b and sending the random numbers to the accelerator unit;

in parallel with generating the random numbers for batch b, copying batch b from the host computer to the accelerator unit; and in the accelerator unit, in parallel with said copying of batch b, sorting the random numbers for coordinates in the previous batch (b−1) to randomly permute the coordinates and performing said stochastic optimization process for the permuted coordinates in batch (b−1) to update the model vector w in dependence on coordinates in that batch.

2. The computer-implemented method as claimed in claim 1 including, in the host computer, generating said random numbers for respective coordinates in an asynchronous parallel fashion.

3. The computer-implemented method as claimed in claim 1 including, in the accelerator unit, performing the stochastic optimization process for the batch (b−1) in an asynchronous parallel fashion.

4. The computer-implemented method as claimed in claim 1 including sending said random numbers from the host computer to the accelerator unit after copying the batch b to the accelerator unit.

5. The computer-implemented method as claimed in claim 1 wherein said stochastic optimization process comprises a stochastic coordinate descent process.

6. The computer-implemented method as claimed in claim 1 wherein said stochastic optimization process comprises a stochastic gradient descent process.

7. The computer-implemented method as claimed in claim 1 including, in the processing system, iteratively processing said successive batches of training data until a predetermined criterion is met.

8. The computer-implemented method as claimed in claim 1 including storing said training data matrix X in memory of the host computer, wherein said successive batches of training data collectively comprise the entire matrix X.

9. The computer-implemented method as claimed in claim 1 including storing a portion of said training data matrix X in memory of the host computer, said portion being defined by a set of one of said row and column coordinates, wherein said successive batches of training data are defined by respective subsets of said set.

10. A heterogeneous processing system for training a machine learning model via a stochastic optimization process for optimizing a function of a training data matrix X, having data elements $X_{i,j}$ with row coordinates i=1 to n and column coordinates j=1 to m, and a model vector w having elements $w_j$, wherein the heterogeneous processing system comprises a host computer operatively interconnected with an accelerator unit and is adapted such that, for successive batches of the training data defined by respective subsets of one of said row coordinates and column coordinates:

the host computer generates random numbers associated with respective coordinates in a current batch b and sends the random numbers to the accelerator unit;

in parallel with generating the random numbers for batch b, batch b is copied from the host computer to the accelerator unit; and in parallel with said copying of batch b, the accelerator unit sorts the random numbers for coordinates in the previous batch (b−1) to randomly permute the coordinates and performs said stochastic optimization process for the permuted coordinates in batch (b−1) to update the model vector w in dependence on coordinates in that batch.

11. The system as claimed in claim 10 wherein the host computer is adapted to generate said random numbers for respective coordinates in an asynchronous parallel fashion.

12. The system as claimed in claim 10 wherein the accelerator unit is adapted to perform the stochastic optimization process for the batch (b−1) in an asynchronous parallel fashion.

13. The system as claimed in claim 10, the system being adapted to send said random numbers from the host computer to the accelerator unit after copying the batch b to the accelerator unit.

14. The system as claimed in claim 10 wherein the accelerator unit is adapted perform a stochastic coordinate descent process for said permuted coordinates.

15. The system as claimed in claim 10 wherein the accelerator unit is adapted perform a stochastic gradient descent process for said permuted coordinates.

16. The system as claimed in claim 10 wherein the system is adapted to iteratively process said successive batches of training data until a predetermined criterion is met.

17. The system as claimed in claim 10 wherein the host computer is adapted to store said training data matrix X in memory operatively coupled to the host computer, and said successive batches of training data collectively comprise the entire matrix X.

18. The system as claimed in claim 10 wherein the host computer is adapted to store a portion of said training data matrix X in memory operatively coupled to the host computer, said portion being defined by a set of one of said row and column coordinates, wherein said successive batches of training data are defined by respective subsets of said set.

19. The system as claimed in claim 10 wherein the accelerator unit comprises at least one graphics processing unit.

20. The system as claimed in claim 10 wherein the accelerator unit comprises at least one field-programmable gate array.

21. A computer program product for training a machine learning model in a heterogeneous processing system comprising a host computer operatively interconnected with an accelerator unit, via a stochastic optimization process for optimizing a function of a training data matrix X, having data elements $X_{i,j}$ with row coordinates i=1 to n and column coordinates j=1 to m, and a model vector w having elements $w_j$, said computer program product comprising a computer readable storage medium having program instructions embodied therein, the program instructions being executable by the processing system to cause the system, for successive batches of the training data defined by respective subsets of one of said row coordinates and column coordinates, to:

generate, in the host computer, random numbers associated with respective coordinates in a current batch b and send the random numbers to the accelerator unit;

in parallel with generating the random numbers for batch b, copy batch b from the host computer to the accelerator unit; and in the accelerator unit in parallel with said copying of batch b, sort the random numbers for coordinates in the previous batch (b−1) to randomly permute the coordinates and perform said stochastic optimization process for the permuted coordinates in batch (b−1) to update the model vector w in dependence on coordinates in that batch.

22. A computer program product as claimed in claim 21, said program instructions being further executable to cause the host computer to generate said random numbers for respective coordinates in an asynchronous parallel fashion.

23. A computer program product as claimed in claim 21, said program instructions being further executable to cause the accelerator unit to perform the stochastic optimization process for the batch (b−1) in an asynchronous parallel fashion.

24. A computer program product as claimed in claim 21, said program instructions being executable to cause the accelerator unit to perform a stochastic coordinate descent process for said permuted coordinates.

25. A computer program product as claimed in claim 21, said program instructions being executable to cause the accelerator unit to perform a stochastic gradient descent process for said permuted coordinates.

* * * * *